US012371112B2

(12) United States Patent
Nowack et al.

(10) Patent No.: US 12,371,112 B2
(45) Date of Patent: Jul. 29, 2025

(54) PIN BOX ASSEMBLY WITH ADJUSTABLE ENGAGEMENT DEVICE

(71) Applicant: HORIZON GLOBAL AMERICAS INC., Plymouth, MI (US)

(72) Inventors: Curt Nowack, Plymouth, MI (US); Bradley Larsh, Plymouth, MI (US); Owen Draper, West Bloomfield, MI (US); Jeremy Butler, Plymouth, MI (US); Henry James Guthard, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 636 days.

(21) Appl. No.: 17/633,320

(22) PCT Filed: Aug. 10, 2020

(86) PCT No.: PCT/US2020/045574
§ 371 (c)(1),
(2) Date: Feb. 7, 2022

(87) PCT Pub. No.: WO2021/026524
PCT Pub. Date: Feb. 11, 2021

(65) Prior Publication Data
US 2022/0289316 A1    Sep. 15, 2022

Related U.S. Application Data

(60) Provisional application No. 62/884,388, filed on Aug. 8, 2019.

(51) Int. Cl.
*B62D 53/08*    (2006.01)
*B60D 1/01*    (2006.01)
(Continued)

(52) U.S. Cl.
CPC ......... *B62D 53/0842* (2013.01); *B60D 1/015* (2013.01); *B60D 1/065* (2013.01); *B60D 1/46* (2013.01); *B60D 1/488* (2013.01)

(58) Field of Classification Search
CPC .... B62D 53/0842; B60D 1/015; B60D 1/065; B60D 1/46; B60D 1/488
See application file for complete search history.

(56) References Cited

U.S. PATENT DOCUMENTS 3,972,542 A    8/1976    Dirks et al.
5,890,728 A    4/1999    Zilm
(Continued)

OTHER PUBLICATIONS

Patent Cooperation Treaty (PCT), International Search Report and Written Opinion for Application PCT/US2020/045574 filed Aug. 10, 2020, mailed Oct. 20, 2020, International Searching Authority, US.

*Primary Examiner* — Valentin Neacsu
*Assistant Examiner* — Michael R Stabley
(74) *Attorney, Agent, or Firm* — DAY PITNEY LLP; George N. Chaclas; Erica A. Fishel

(57) ABSTRACT

Disclosed is a pin box assembly that includes an adjustment assembly configured to adjust a range of pivotal movement of a towed vehicle related to a towing vehicle. The pin box assembly includes a towed vehicle attachment member, an elongated arm, and a king pin with an adjustment assembly. The adjustment assembly may include a wedge and an adjustment member that is configured to translate or pivot the wedge relative to the king pin to modify a range of angular rotation between the elongated arm and the fifth wheel hitch.

18 Claims, 14 Drawing Sheets

(51) Int. Cl.
*B60D 1/06* (2006.01)
*B60D 1/46* (2006.01)
*B60D 1/48* (2006.01)

(56) References Cited

U.S. PATENT DOCUMENTS

| | | | |
|---|---|---|---|
| 6,971,660 B1 * | 12/2005 | Putnam | B60D 1/363 |
| | | | 280/901 |
| 7,121,574 B2 * | 10/2006 | Bouwkamp | B62D 53/0842 |
| | | | 280/425.2 |
| 7,530,591 B2 | 5/2009 | Mater et al. | |
| 7,703,792 B1 * | 4/2010 | Heitzmann | B62D 53/061 |
| | | | 280/455.1 |
| 7,997,608 B2 | 8/2011 | Mater et al. | |
| 2008/0029996 A1 | 2/2008 | Mater et al. | |

* cited by examiner

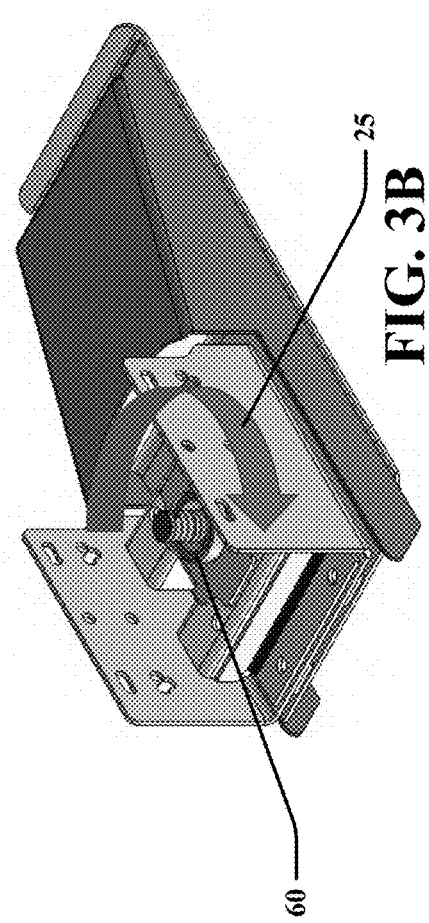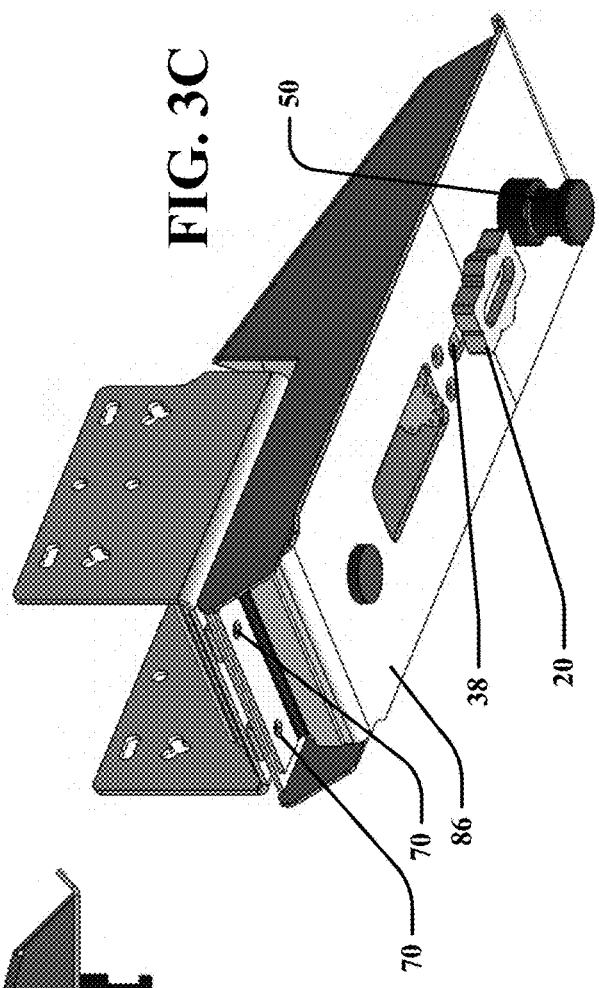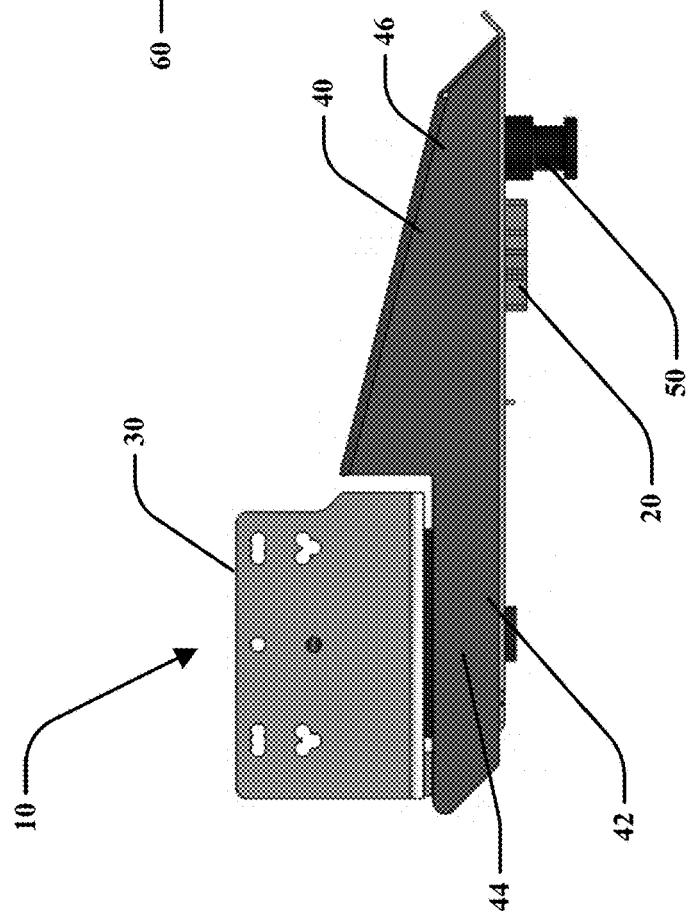

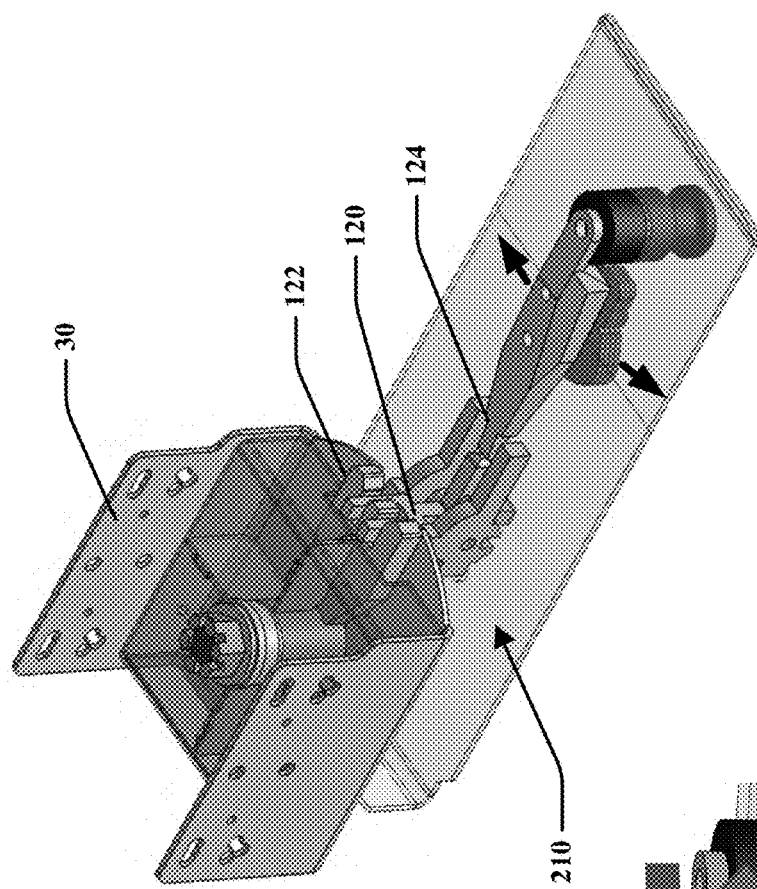
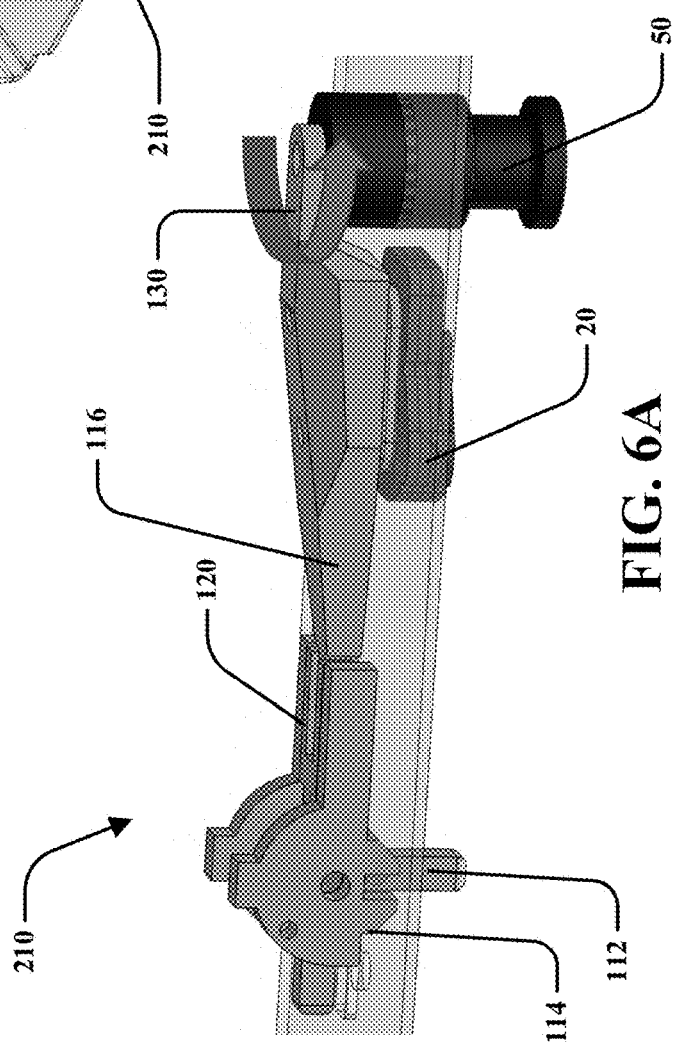
FIG. 6A
FIG. 6B

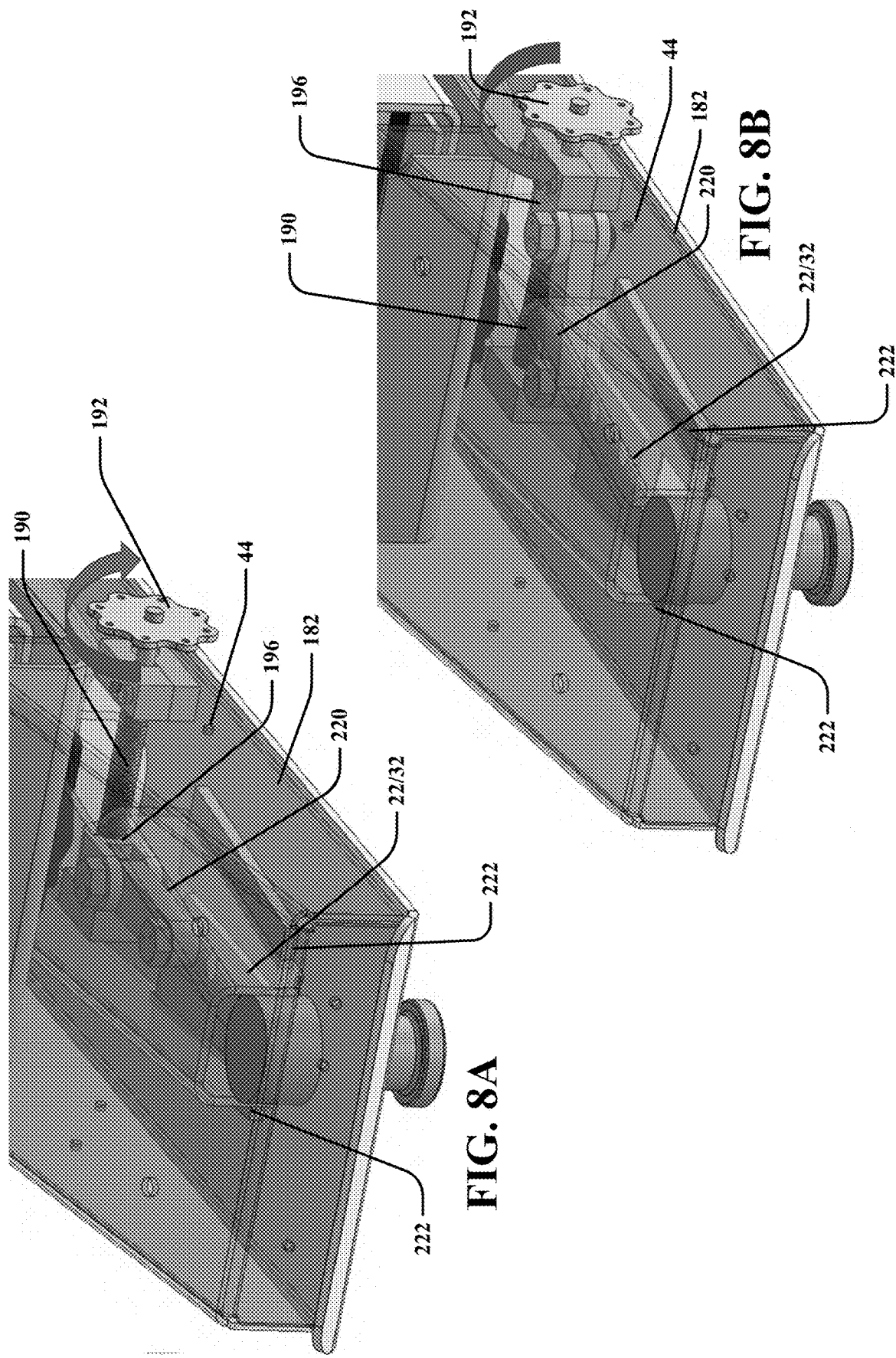

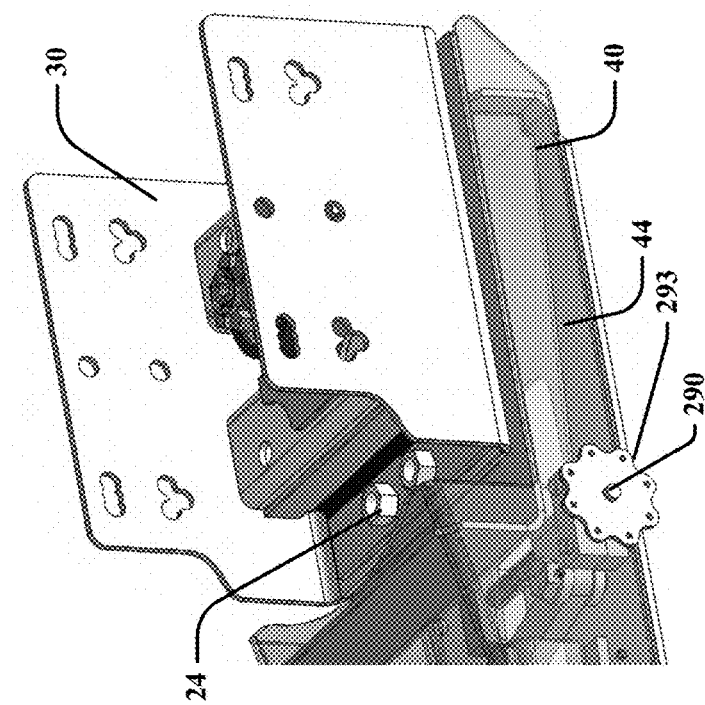
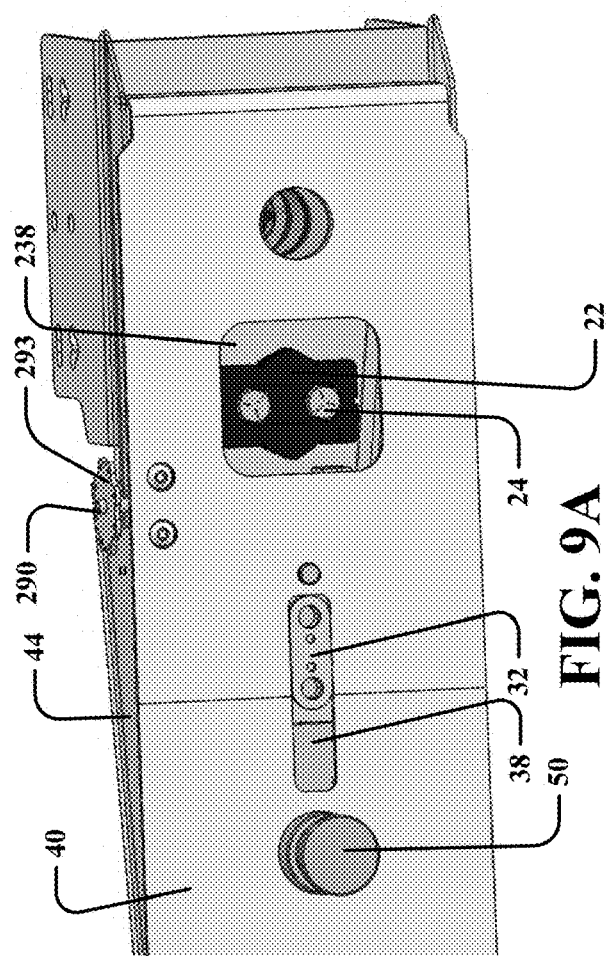
FIG. 9B
FIG. 9A

PIN BOX ASSEMBLY WITH ADJUSTABLE ENGAGEMENT DEVICE

CROSS REFERENCE TO RELATED APPLICATIONS

This application is a 35 U.S.C. 371 national stage filing of PCT Application No. PCT/US2020/045574 filed on Aug. 10, 2020 and entitled "PIN BOX ASSEMBLY WITH ADJUSTABLE ENGAGEMENT DEVICE" which claims priority to U.S. Provisional Patent Application No. 62/884,388, filed on Aug. 8, 2019 and entitled "Pin Box Assembly with Adjustable Engagement Device," each of which are hereby incorporated by reference in their entireties.

FIELD OF THE INVENTION

The present invention is generally related to a towing assembly and, more particularly, to a pin box assembly with an adjustable engagement device.

BACKGROUND

Many vehicles are designed to transport freight, goods, merchandise, personal property, and other such cargo. Often, such vehicles may be arranged to tow a trailer by attaching the trailer to the towing vehicle, such as through the use of a hitch assembly of some configuration. The towing industry has developed a number of methods and apparatuses for securing or engaging the towed vehicle or trailer to the towing vehicle, such as a pickup truck.

There are many different types of hitch assemblies in the art that may be attached to the towing vehicle in a variety of ways, depending on the type of hitch assembly utilized. Trailers may be connected to the towing vehicle by way of a hitch assembly including a ball hitch or member secured to the towing vehicle and a ball socket coupling mechanism on the towed vehicle or trailer that mounts to a fifth wheel hitch that allows for the trailer to pivot behind the towing vehicle in a certain manner.

A fifth wheel hitch is utilized with towed vehicles having a king pin, which may be part of a pin box attached to the towed vehicle. Known pin boxes include assemblies disclosed in U.S. Pat. Nos. 7,530,591 and 7,997,608 which are incorporated by reference in their entireties. FIG. 1 illustrates an embodiment of a known pin box assembly 100 that includes an elongated arm 102, a trailer mount 104 and a king pin 106. As illustrated by FIG. 2A, the trailer mount 104 may be fixed to a frame F of a trailer T by mounting flanges 132. The elongated arm 102 may pivot freely relative to the trailer mount 104 and trailer T on the pivot shaft on the elongated arm about vertical trailer axis TA. The king pin 106 is secured adjacent a second end of the elongated arm 102. The king pin 106 is received in the jaw of the tow hitch H (or fifth wheel hitch) carried in the bed of a towing vehicle V behind the cab C about vertical king pin axis PA. As illustrated by FIG. 2B, a stop 168 on a base of the king pin 106 is received in and aligned with the throat N of the skid plate S. The sidewalls 170 of the stop 168 substantially fill the throat N and are in close clearance with the edges of the skid plate S defining the throat N leading to the jaw of the tow hitch H. The engagement of the sidewalls 170 with the skid plate S function to limit or substantially eliminate any pivoting motion between the elongated arm 102 and the tow hitch H about the king pin 106. Pivotal movement between the trailer T and the towing vehicle V occurs only at the second end of the elongated arm 102 underneath the trailer T at the pivot shaft. Due to ease of hookup, recreational vehicles or travel trailers (RV) as well as horse or livestock trailers, may typically utilize a king pin and fifth wheel hitch to couple to a towing vehicle.

In operation, a consequence is that a user may need to modify the pivotable range of motion of the towed vehicle in relationship to the towing vehicle along the pin box. The swapping of or modification of such a pivotable range of motion is difficult due to the high towing forces and various members incorporated with such a towing system. Thus, there is a need to allow for modification and flexibility in providing a pivotal range of motion for such a pin box type of a towing assembly.

SUMMARY

A pin box assembly for coupling a towed vehicle to a towing vehicle is disclosed. The pin box assembly may include a first member capable of being secured to a towed vehicle and an elongated arm and a king pin for attachment to a fifth wheel hitch of a towing vehicle. The pin box assembly may further include an adjustment assembly attached to the elongated arm for adjusting degrees of allowable rotation of the elongated arm relative to the fifth wheel hitch attached to the towing vehicle.

In an embodiment, the pin box assembly for coupling a towed vehicle to a towing vehicle comprises a turret member capable of being secured to a towed vehicle, an elongated arm attached to the turret member, and a king pin attached to the elongated arm that is capable of being secured to a fifth wheel hitch of a towing vehicle wherein the elongated arm is configured to rotate along an axis of rotation aligned along the king pin to allow the elongated arm to pivot relative to the fifth wheel hitch. An adjustment assembly may be attached to the elongated arm for adjusting an axis of rotation of the elongated arm relative to the fifth wheel hitch. The adjustment assembly may include a wedge configured to be translated to a position towards the kingpin to decrease a range of motion of the elongated arm relative to the fifth wheel hitch and to be translated to a position away from the kingpin to increase a range of motion of the elongated arm relative to the fifth wheel hitch. The adjustment assembly may include a wedge configured to be translated along a pivotal direction that is generally transvers to a length of the elongated arm to allow for a range of rotation of the elongated arm relative to a fifth wheel hitch. The wedge may include a shape having a slender portion positioned towards the king pin that transitions to a wide portion positioned away from the king pin.

The pin box assembly may provide that the abutment assembly includes a wedge having a shape with a first abutment side along the wide portion of the wedge and a second abutment side along an opposite side of the wide portion of the wedge wherein the first abutment side and second abutment side have a generally complementary shape to opposing walls of the fifth wheel hitch. An adjustment member may be attached to the elongated arm and be configured to adjust a position of a wedge or a base of the adjustment assembly relative to the king pin. The adjustment member may include at least one of a snubber member, a manual rotation member, an over center cam mechanism, a rotatable wedge and pivot system, a drop lock member, a gear adjuster, a spring switch, a slide lock, a throat wedge spring member, and a throat wedge screw member. The turret member may be configured to rotate about an axis of rotation at a turret axis aligned along the turret member to allow the towed vehicle to pivot or swivel relative to the elongated arm wherein as the wedge is adjusted or translated to a position away from the king pin and generally spaced from opposing walls of the fifth wheel hitch, the turret member may be pivotally locked relative to the elongated arm and the elongated arm is allowed to rotate between a first pivotal position and a second pivotal positon. The adjustment member includes the rotatable wedge and pivot system that further comprises a locking member configured to toggle the turret member between a locked position and an unlocked position wherein in the locked position, the turret member does not pivot relative to the elongated arm and in the unlocked position, the turret member is allowed to pivot relative to the elongated arm.

In another embodiment, provided is a pin box assembly for coupling a towed vehicle to a towing vehicle comprising a turret member capable of being secured to a towed vehicle, an elongated arm attached to the turret member, a king pin for attachment to a fifth wheel hitch of a towing vehicle, and an adjustment assembly including an adjustment member and a wedge wherein the adjustment member is configured to adjust a position of the wedge relative to the king pin for adjusting the axis of rotation of the elongated arm relative to the fifth wheel hitch. The wedge may be positioned along an underside of the elongated arm and is attached to a base positioned within the elongated arm such that the wedge and base are configured to be translated to a position towards the kingpin to decrease a range of motion of the elongated arm relative to the fifth wheel hitch and to be translated to a position away from the kingpin to increase a range of motion of the elongated arm relative to the fifth wheel hitch. The wedge may be positioned along an underside of the elongated arm and is attached to a base positioned within the elongated arm such that the wedge and base are configured to be translated along a pivotal direction that is generally transvers to a length of the elongated arm to allow for a range of rotation of the elongated arm relative to a fifth wheel hitch. The wedge may include a shape having a slender portion positioned towards the king pin that transitions to a wide portion positioned away from the king pin wherein the wedge having a shape with a first abutment side along the wide portion of the wedge and a second abutment side along an opposite side of the wide portion of the wedge wherein the first abutment side and second abutment side have a generally complementary shape to opposing walls of the fifth wheel hitch. The adjustment member includes at least one of a snubber member, a manual rotation member, an over center cam mechanism, a rotatable wedge and pivot system, a drop lock member, a gear adjuster, a spring switch, a slide lock, a throat wedge spring member, and a throat wedge screw member. The adjustment member includes the rotatable wedge and pivot system that further comprises a locking member configured to toggle the turret member between a locked position and an unlocked position wherein in the locked position, the turret member does not pivot relative to the elongated arm and in the unlocked position, the turret member is allowed to pivot relative to the elongated arm. The elongated arm may include an aperture along an underside wherein said aperture allow a user to access the adjustable member or store the wedge within the elongated arm. The adjustment member may be a side mounted manual rotation member mounted along a side of the elongated arm.

BRIEF DESCRIPTION OF THE DRAWINGS

Operation of the present disclosure may be better understood by reference to the following detailed description taken in connection with the following illustrations, wherein:

FIG. 3A is a side view of a pin box assembly that includes an adjustment assembly according to the present disclosure;

FIG. 3B is a top perspective view of the pin box assembly of FIG. 3A according to the present disclosure;

FIG. 3C is a bottom perspective view of the pin box assembly of FIG. 3A that includes an adjustment assembly according to the present disclosure;

FIG. 6A is a schematic view of an embodiment of the adjustment assembly of the pin box assembly with a locking member according to the present disclosure;

FIG. 6B is a schematic view of an embodiment of the adjustment assembly of the pin box assembly with a locking member according to the present disclosure;

FIG. 8A is a schematic view of an embodiment of the adjustment assembly of the pin box assembly in an extended position according to the present disclosure;

FIG. 8B is a schematic view of an embodiment of the adjustment assembly of the pin box assembly in a retracted position according to the present disclosure;

FIG. 9A is a schematic view of an embodiment of the pin box adjustment assembly in an extended position according to the present disclosure;

FIG. 9B is a schematic view of an embodiment of the pin box adjustment assembly in a retracted position according to the present disclosure;

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Figure 1:
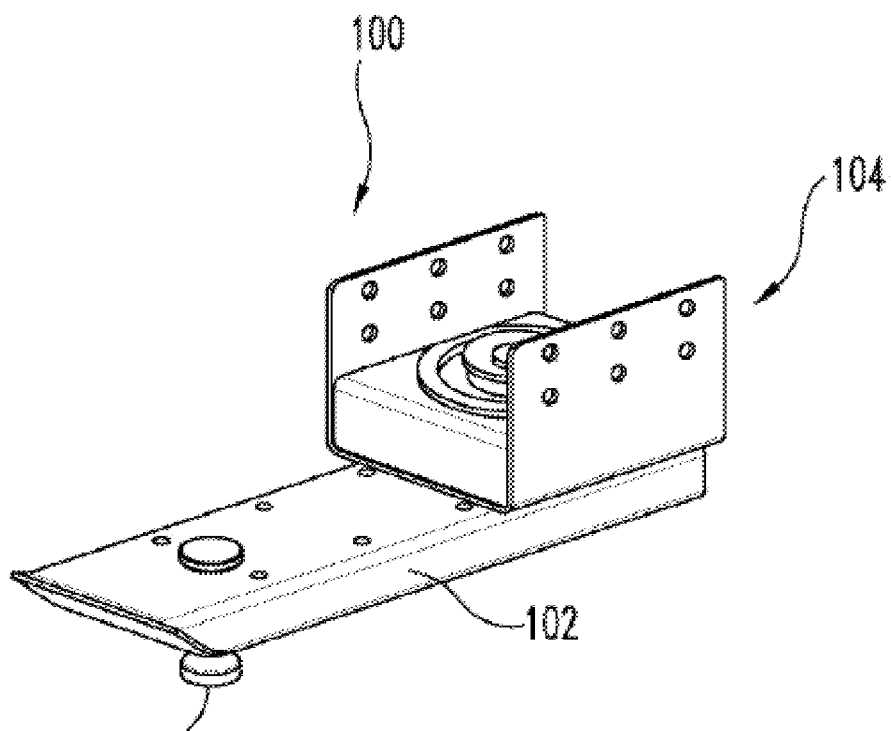
FIG. 1 is a perspective view of an embodiment of a prior art version of a pin box assembly.
Figure 2A:
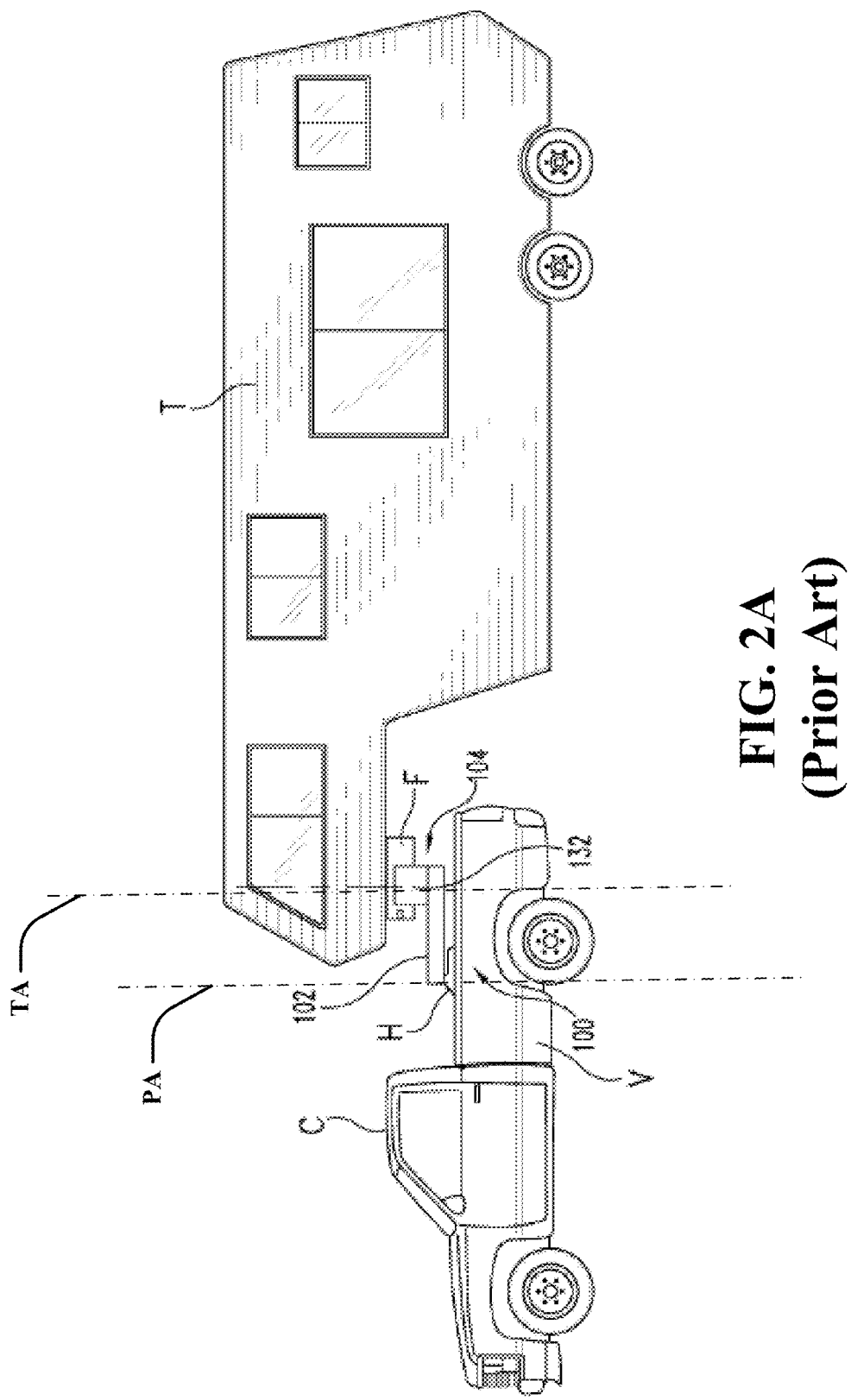
FIG. 2A is a side view of the prior art pin box assembly coupled to a trailer and a towing vehicle.

A pin box assembly 10 with adjustment assembly 20 is illustrated in FIGS. 3A, 3B, and 3C. The pin box assembly 10 may be configured to engage a towing vehicle of any appropriate configuration, such as a pickup truck, and a towed vehicle, such as a recreational vehicle (RV), an example of which is shown in FIG. 2A. Although, the pin box assembly 10 may engage with any appropriate towing and towed vehicles and are not limited to those shown herein, which are merely exemplary. The pin box assembly 10 may be of any appropriate shape, size, type or configuration, whereby it may have an appearance of a conventional pin box (e.g., one used to couple an RV to a fifth wheel hitch) when compared to the look of a traditional pin box in use with a pin box adaptor. In addition, the pin box assembly 10 may be a stand alone unit with suspension and may provide for an increased range of motion. The pin box assembly 10 may include a towed vehicle attachment assembly 30 (also called a turret), an elongated arm 40, a king pin 50 and an adjustment assembly 20. The adjustment assembly 20 may include a wedge 22 that includes a body 21 shaped to engage with a fifth wheel hitch H or other hitch assembly of a towing vehicle. The king pin 50 of the pin box assembly 10 may engage a towing vehicle attachment assembly such as a fifth wheel hitch in any appropriate manner along a king pin axis PA as illustrated by FIG. 2A.

The towed vehicle attachment assembly 30 may be part of or otherwise attached to the towed vehicle or trailer T, such as coupled to the frame F of towed vehicle, or may be part of the pin box assembly 10. Alternatively, the frame of the towed vehicle may include the towed vehicle attachment assembly 30 to which the pin box assembly 10 may be secured. RVs may come equipped with such an attachment assembly 30. By way of a non-limiting example, the pin box assembly 10 may be secured or bolted up onto an existing frame of the towed vehicle, whereby the existing frame of the towed vehicle along with the towed vehicle attachment assembly 30 may rotate about a pivot shaft 60 as illustrated by FIG. 3B. By way of non-limiting example, the foregoing may rotate about the pivot shaft 60 as depicted by arrow 25 in FIG. 3B and may be aligned along a trailer axis TA as illustrated by FIG. 2A.

The pivot shaft 60 may be rotatable relative to the elongated arm 40 along a first end 44 which may be located along the elongated arm 40 opposite from the kin pin 50 positioned on an adjacent second end 46. In one embodiment, as illustrated by FIG. 3C, apertures 70 may be aligned though the towed vehicle attachment assembly 30 and at or around the first end 44 of the elongated arm 40 to receive bolts or fasteners therein to provide the ability to prevent rotation between the vehicle attachment assembly 30 and the elongated arm 40 about the pivot shaft 60. The elongated arm 40 may include a housing 42 for shrouding components including components associated with the adjustment assembly 20 or a locking mechanism which will be described in more detail below.

Generally, the alignment of the king pin 50 relative to the fifth wheel hitch H is required to engage and disengage the towed vehicle T relative to the towing vehicle V. The addition of the adjustment assembly 20 limits the rotation about the king pin 50—it allows all rotation to occur about the pivot shaft 60. The adjustment assembly 20 of the instant disclosure allows for wedge 22 adjustments (fore/aft and left/right directions) that can be manually accessible to a user without having to unhitch the king pin 50 from the fifth wheel hitch H to allow adjustments. In some embodiments, the adjustment assembly 20 is not in the direct load path of the wedge 22 relative to the fifth wheel hitch. The wedge 22 of any of the embodiments of the present teachings allows users to adjust the position of the wedge 22 in a manner that is easier than prior art systems. Users can access the wedge 22 or a portion thereof to adjust the same without having to disassemble portions of the pin box assembly 10, the manner of adjusting the wedge 22 is accessible to the user, it may require little or no tools to accomplish and can be adjusted easily by the user. Moreover, the adjustment may provide feedback to the user that the applicable adjustment has been made (e.g., it provides a tactile response that the adjustment has been made), the systems disclosed below may prevent the user from making errors in the adjustment and may allow a single user to make the adjustments.

Figure 4A:
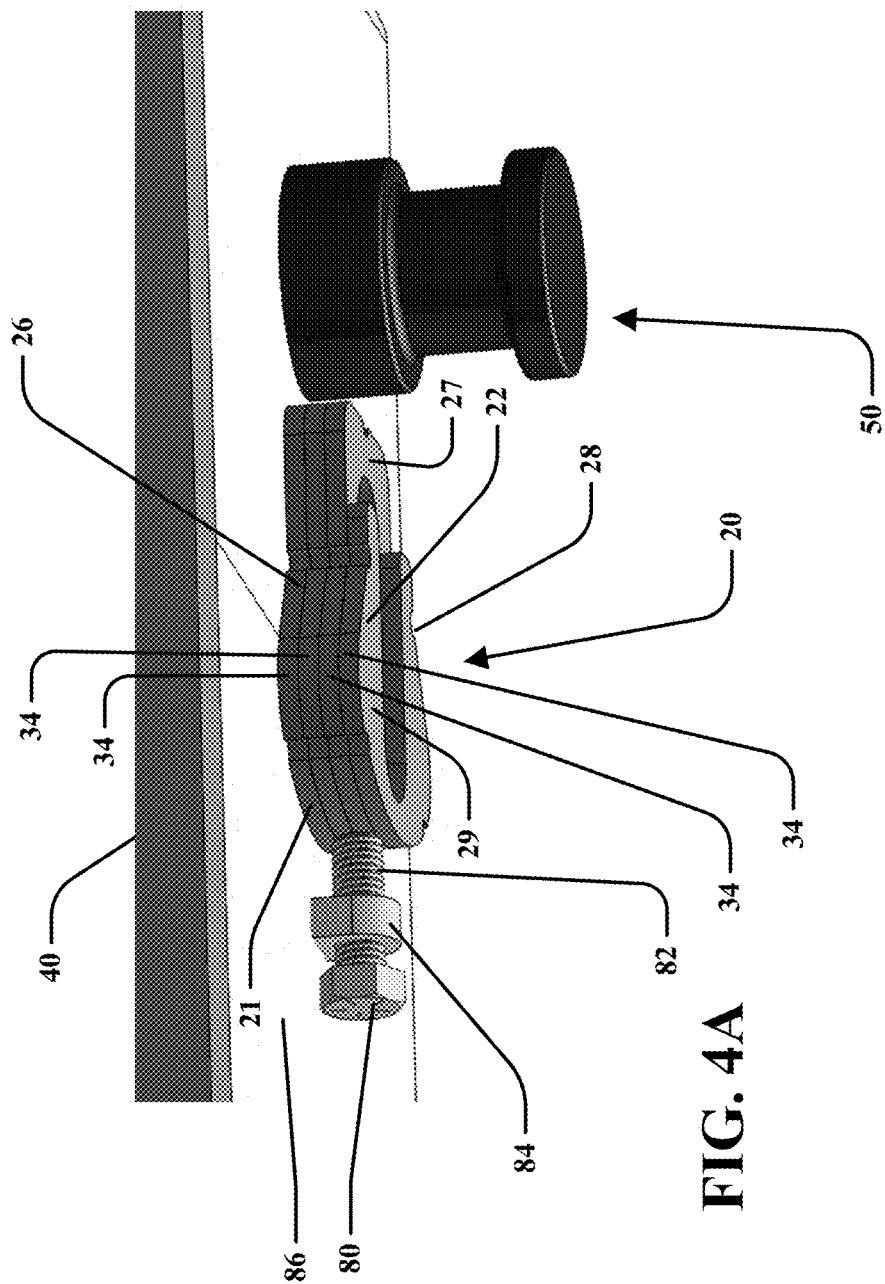
FIG. 4A is a schematic view of an embodiment of an adjustment assembly of the pin box assembly according to the present disclosure.

FIG. 4A illustrates an embodiment of the adjustment assembly 20. The adjustment assembly 20 or a portion thereof may translate along a length of the elongated arm 40 to abut opposing walls W or a stop N within the throat N of the fifth wheel hitch assembly H attached to the towing vehicle V. Movement of the adjustment assembly 20 relative to the king pin 50 may allow for the rotational range of motion between the elongated arm 40 and the fifth wheel hitch assembly to be adjusted. As the adjustment assembly 20 is translated towards the king pin 50 the range of pivotal motion decreases and as the adjustment assembly 20 is translated away from the king pin 50 the range of pivotal motion increases.

Figure 2B:
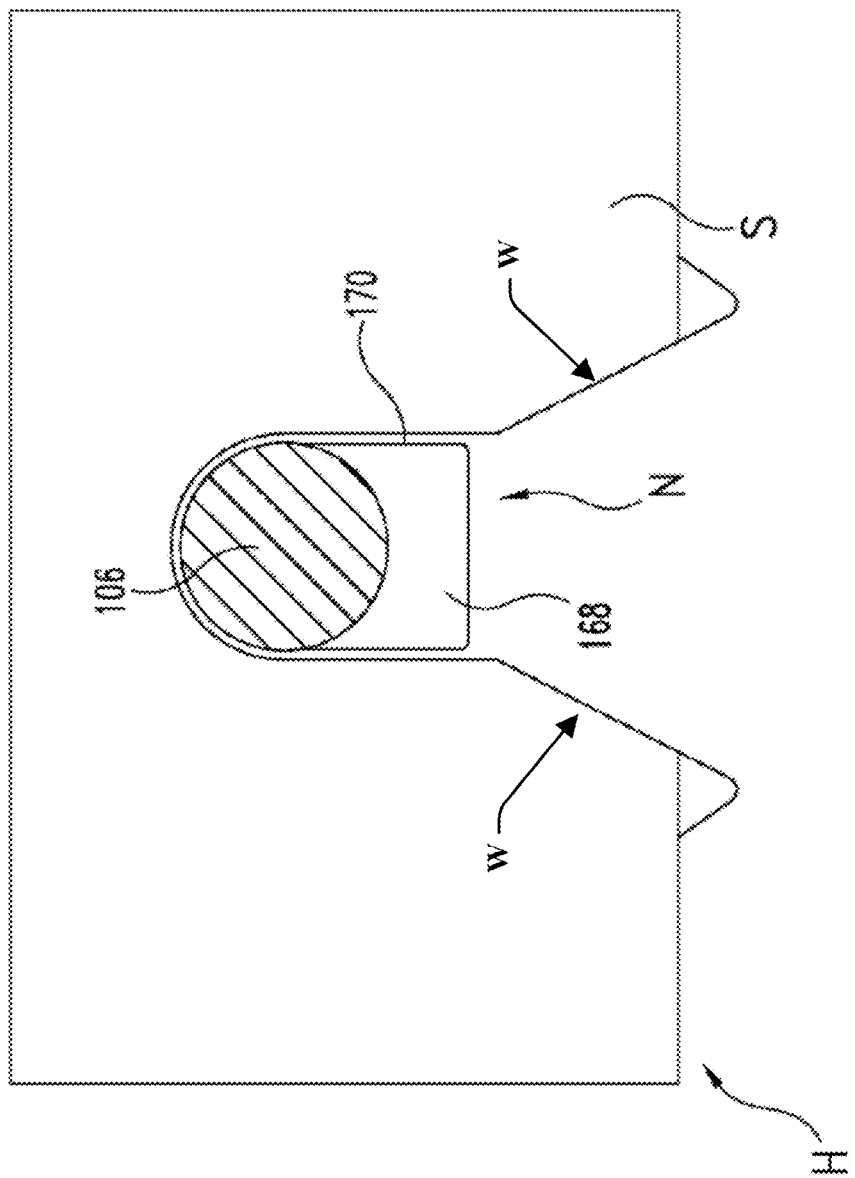
FIG. 2B is a top cross sectional view of the prior art pin box assembly of FIG. 2A coupled to a skid plate on a towing vehicle.
Figure 4B:
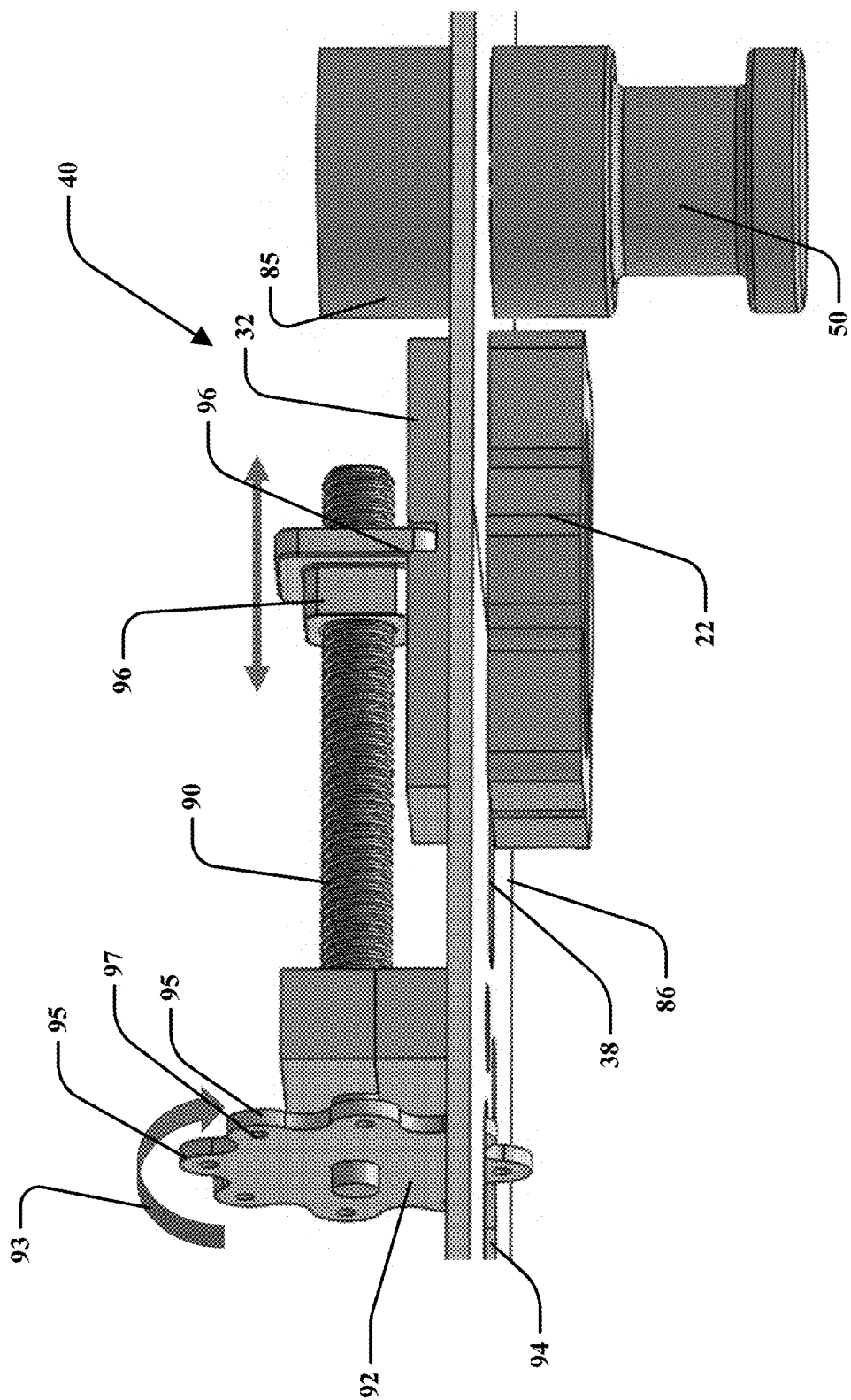
FIG. 4B is a schematic view of an embodiment of the adjustment assembly of the pin box assembly according to the present disclosure.
Figures 4C, 4D:
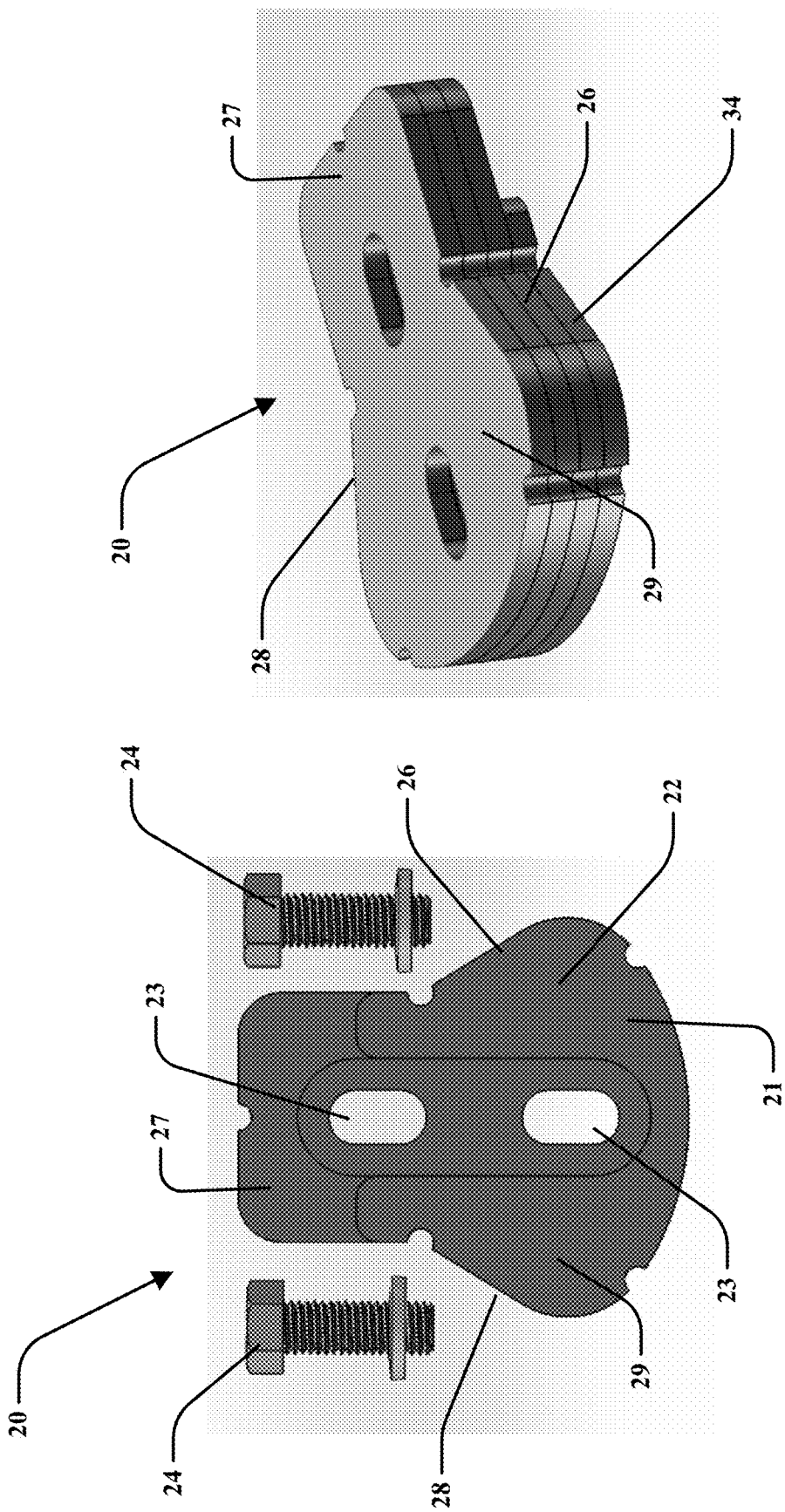
FIG. 4C a plan view of an embodiment of the adjustment assembly of the pin box assembly according to the present disclosure.
FIG. 4D a perspective view of an embodiment of the adjustment assembly of the pin box assembly according to the present disclosure.

In an embodiment as illustrated by FIGS. 4C and 4D, the adjustment assembly 20 may include openings 23, such as a pair of slots, to receive fasteners 24 such as bolts and washers to connect to the elongated arm 40. This configuration allows for the wedge 22 to be rigidly and structurally attached to the elongated arm 40 but also selectively removable therefrom and selectively translatable relative to the elongated arm 40. The wedge 22 may include a perimeter having a first abutment side 26 and a second abutment side 28 opposite the first abutment side 26. The abutment sides 26, 28 may be shaped and configured to abut against opposite walls W or jaw portions of the fifth wheel hitch assembly of the towing vehicle when the elongated arm 40 pivots about rotational axis located at the king pin 50. FIG. 2B illustrates the walls W in which abutment sides 26, 28 may be configured to abut when the king pin 50 is attached to the fifth wheel hitch assembly. The wedge 22 may also include a plurality of plates 34 that are stacked together wherein each plate may includes a similar perimeter shape. In one embodiment, plates may be generally modular as one or more plates 34 may be added or removed to adjust the thickness of the wedge 22 as needed for proper functioning of the assembly. The plates 34 may be of any appropriate configuration and are not limited to just the configuration shown. In some embodiments, the plates 34 may be of different shapes or some of the plates 34 may be of one shape while others of the plates may be of a different shape. The shape of the applicable plates 34 may depend on its location relates to the king pin 50. Any appropriate number of plates 34 may be utilized, e.g., one, two, three, four, five, six, seven, etc., without departing from the present teachings. The wedge 22 may also comprise a single member instead of the plurality of plates 34 as described herein. Further, the shape of the wedge 22 described herein is merely exemplary. It may comprise any appropriate shape and is not limited to the shape shown and described herein.

As illustrated by FIGS. 4A and 4C, the body 21 of the wedge 22 may have a shape that includes a slender portion 27 positioned generally towards the king pin 50 that transitions to a wide portion 29 positioned further away from the king pin 50. In this embodiment, the first abutment side 26 and second abutment side 28 include angular sides that transition from the slender portion 27 to the wide portion 29 such that the angled configuration of the first and second abutment sides 26, 28 are generally complementary shaped to the opposing walls W of the fifth wheel hitch.

Turning to and embodiment of FIG. 4A, the adjustment assembly 20 may further include an adjustment member wherein in this embodiment, the adjustment member is a snubber member 80 having a threaded member 82 rotationally engaged with the body 21 of the wedge 22 of the adjustment assembly 20 through a nut 84 attached to an underside 86 of the elongated arm 40. The snubber 80 may allow the adjustment assembly 20 to be translated towards or away (fore/aft) from the king pin 50 by rotation of the threaded member 82. Rotation of the threaded member 82 may translate the wedge 22 towards or away from the king pin 50 as it is attached to the underside 86 of the elongated arm 40. Notably, the body 21 of the wedge 22 may be attached to the underside 86 of the elongated arm 40 by fasteners 24 (FIG. 4C) that align or generally align within at least one slot (FIG. 3C) through the underside 86 of the elongated arm 40. The fasteners 24 may be guided within the slot 38 or slots for directing the translation of the wedge 22 both towards and away from the king pin 50 as desired for adjustment of the wedge 22 relative to the fifth wheel hitch assembly. Notably, the adjustment of the wedge 22 can be accomplished without having to remove the adjustment assembly 20 from the pin box assembly 10. Further adjustment of the wedge 22 may be accomplished without having to disengage the king pin 50 from the fifth wheel hitch assembly. Further still, the wedge 22 may be positioned on the elongated arm 40 to allow a user access thereto to make the adjustment without having to remove other components of the pin box assembly 10. The wedge 22 may be positioned so that it is easier to access and operate for a single user.

Notably, the various embodiments described herein are contemplated to be combined with various features of the other of said embodiments and this disclosure is not limited in this regard. FIG. 4B illustrates another embodiment of the adjustment assembly 20 wherein the wedge 22 is mounted to a base 32 positioned within the elongated arm 40. Here, fasteners 24 may be positioned through slots 23 on the wedge 22 and through the slot 38 of the underside 86 of the elongated arm 40 to be attached to the base 32. In this embodiment, the adjustment assembly 20 includes the adjustment member in the form of a manual rotation member 92 of any appropriate configuration, including, without limitation, as a dial as shown in FIG. 4B. Although a dial is shown, any configuration of a manual rotation member 92 may be utilized without departing from the present teachings, e.g., toggle, knob, snubber, switch, or other actuator. The adjustment assembly 20 may also include a threaded member or screw 90 that translates the wedge 22 towards or away from the king pin 50. The threaded member or screw 90 may be operatively attached (e.g., threadably attached) with the manual rotation member 92 such that rotation of the manual rotation member 92 will rotate the threaded member 90. In particular, rotation of the manual rotation member 92 in a first direction shown in FIG. 4B as arrow 93 will cause rotation of rotate the threaded member 90, which may cause the applicable movement of the wedge 22 as described in more detail herein.

The wedge 22 may be mounted along the bottom or underside 86 of the elongated arm 40 while the base 32 may be moveably mounted within the housing 42 of the elongated arm 40 and may be attached to one another through a slot 38 that allows for translational movement of the wedge 22 relative to the elongated arm 40. The base 32 may be a plate that includes a nut 96 mounted thereon for rotational engagement with the screw 90. The base 32 may include a slot that receives and structurally attaches to a portion of the nut 96 to allow for the rotational engagement with the screw 90. A stopper 85 of any appropriate configuration, such as by way of a non-limiting example, a perimeter surface of the king pin 50 as it abuts against the base 32, may prevent the screw 90 from disengaging with the nut 96. Alternatively, the stopper 85 may be any other protrusions that may be located along the screw 90, the nut 96, or along the elongated arm 40 that is configured to abut against the base 32 or wedge 22 to limit translational movement of the wedge 22. The stopper 85 may comprise various other configurations such as a stopper on the screw 90 (e.g., a crushed end), or a separate component that prevents the screw 90 from disengaging with the nut 96.

The manual rotation member 92 may be partially located within the housing 42 of the elongated arm 40 and partially accessible through an aperture 94 sized to allow a user to manually rotate the rotation member 92 for translational adjustment of the wedge 22. The manual rotation member 92 may have a perimeter shaped with lobes extending from a center portion that allows the user to grasp and rotate it. As the manual rotation member is rotated, the screw 90 also rotates and the nut 96 translates along the screw 90 thereby translating the base 32 and wedge 22 relative to the elongated arm 40 and king pin 50. This embodiment may assist to reduce rearward movement of the wedge 22 due to abutment forces acting thereon. Fore/aft translational movement of the wedge 22 is performed by the adjustment assembly 20 that is not along the direct load path (left/right) between the wedge 22 and the fifth wheel hitch assembly.

The manual rotation member 92 may further include a locking portion 97 or a plurality of locking portions 97. As shown in FIG. 4B, the manual rotation member 92 may include a plurality of lobes 95. As shown, the rotation member 92 may include eight lobes 95. It should be understood, however, that the rotation member 92 may include any appropriate number of lobes 95, e.g., one, two, three, four, five, six, seven, nine, ten, etc. Each of the lobes 95 may include the locking portion 97. The locking portion 97 may be configured to have selectively secured thereto a lock (of any appropriate configuration, such as a standard padlock) to prevent further rotation of the manual rotation member 92. A lock may be attached to a lobe 95 as it extends through the aperture 94 to be selectively attached to a locking portion 97 on that lobe 95. The lock would prevent further rotation as it would abut against either sides of the aperture 94. Each of the lobes 95 may include the locking portion 97 or only a select few of the lobes 95 may include the locking portion 97. As shown in the drawings, each of the lobes 95 includes the locking portion 97. The locking portion 97 may be of any appropriate configuration to accept a lock. As shown, the locking portion 97 may comprise an aperture. Alternatively or in addition, the locking portion 97 may include a slot, tab or the like. The lock prevents rotation of the manual rotation member 92, which in turn prevents movement of the wedge 22. In other words, the lock selectively locks the wedge 22 in its current position. To move the wedge 22, the user can remove the lock from the locking portion 97 and then rotate the manual rotation member 92 to reposition the wedge 22. Any appropriate number of locks may be utilized with the present locking portions 97. The lock may be of any appropriate configuration, such as a dial or key locking device. Further still, the lock could be an electronic lock that is selectively lockable and unlockable utilizing an electronic device, such as a smartphone or the like. Further, the lobes 95 may be shaped to assist a user to grasp and rotate the manual rotation member 92. The lobes 95 may be of any appropriate shape and configuration and are not limited to what is shown. For example, the lobes 95 may be generally square, rectangular, oval, and cylindrical or any combination of the foregoing shapes.

The adjustment assembly 20 of the present embodiments allows users to access the wedge 22 or a portion thereof to adjust the same without having to disassemble any portion of the pin box assembly 10. The adjustment assembly 20 provides that adjusting the wedge 22 is accessible to the user, it may require little or no tools to accomplish and can be adjusted easily by the user. Moreover, the adjustment may provide feedback to the user that the applicable adjustment has been made (e.g., it provides a tactile response that the adjustment has been made), the present system may prevent the user from making errors in the adjustment and may allow a single user to make the adjustments.

Figures 5A, 5B:
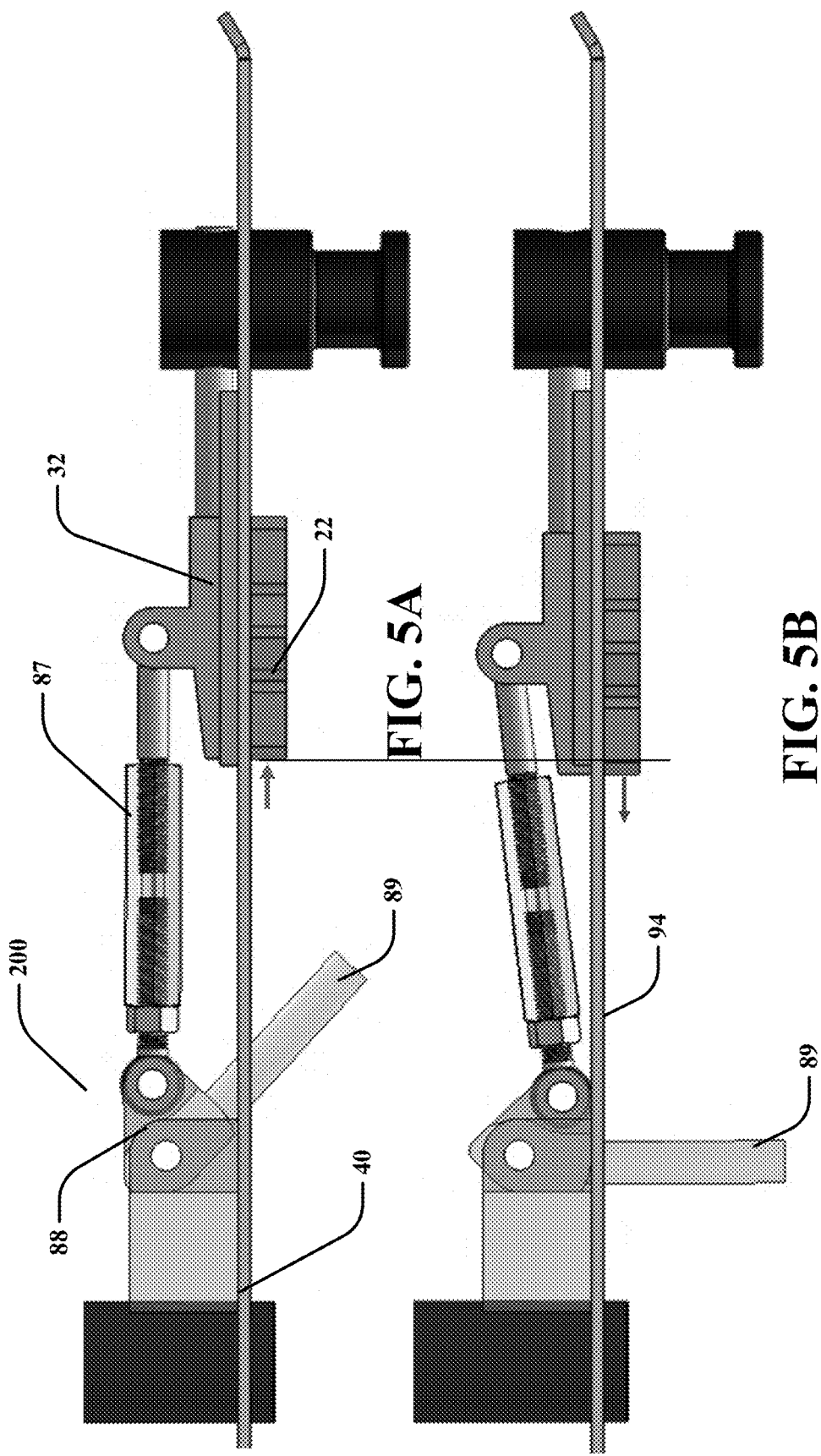
FIG. 5A is a side view of an embodiment of the adjustment assembly of the pin box assembly in an engaged position according to the present disclosure.
FIG. 5B is a side view of an embodiment of the adjustment assembly of the pin box assembly in a hook-up position according to the present disclosure.

FIGS. 5A and 5B illustrate an embodiment of the adjustment assembly 20 wherein the adjustment member is an over center cam mechanism 200. The over center cam mechanism 200 may be toggled between in an engaged/tow position (FIG. 5A) and an adjustment position (FIG. 5B), which may remove a load or a portion of a load on the jaw. This adjustability of the wedge 22 may prevent a problem that would otherwise occur; a tight wedge. The tight wedge puts a load on the jaw, with great enough force that one cannot open the jaw or disengage the fifth wheel hitch. The engaged/tow position allows the wedge 22 to be positioned in the desired location relative to the king pin 50 and the fifth wheel hitch as the towed and towing vehicles are operated during use. The adjustment position allows a user to manually adjust the position of the wedge 22 relative to the king pin 50 when the pin box assembly is not in use. In this embodiment, the wedge 22 may be mounted to the base 32, which may be mounted to the elongated arm 40 and pivotally attached to a turnbuckle member 87. The turnbuckle member 87 may be attached to an over center pivot member 88. A handle 89 extends from the over center pivot member 88 and is accessible through the aperture 94 or bottom opening of the elongated arm 40. FIG. 5A illustrates the adjustment assembly 20 in the engaged/tow position as the wedge 22 is translated towards the king pin 50. FIG. 5B illustrates the adjustment assembly 20 in adjustment position (hook-up/un-hook position) that allows for further adjustments of the wedge 22 by the rotation of the turnbuckle member 87 by the user through the aperture 94. The over center pivot member 88 and handle 89 may have offset points of rotation to assist to toggle between the engaged/tow position and the adjustment position. The over center pivot member 88 and handle 89 may be rotated in either position through the bottom opening 94 of the elongated arm 40 and the turnbuckle 87 may be accessed through the bottom opening 94 of the elongated arm 40 for rotational adjustment of the wedge 22.

FIGS. 6A, 6B, 7A, 7B, and 7C illustrate an embodiment of the adjustment assembly 20 wherein the adjustment member is a rotatable wedge and pivot system 210. FIG. 6A illustrates the adjustment assembly 20 comprising a handle 112, a hinge assembly 114, the wedge 22, a rotatable base 116, and a locking member 120. The locking member 120 may be rotated between engagement with a turret member 122 (FIG. 6B) and a wedge holder member 124 (FIG. 6A) to lock either the towed vehicle attachment assembly 30 or the wedge 22 to prevent rotation relative to the elongated arm 40. An end portion 130 of the rotatable base 116 may be attached to the king pin 50 such that it allows the rotatable base 116 and the adjustment assemble 20 to be selectively rotatable relative to the king pin axis relative to the elongated member 40. This rotation may be engaged or disengaged based on the position of the locking member 120 relative to the turret member 122 and the wedge holder member 124. The wedge holder member 124 is positioned along the opposite side of end portion 130 of the rotatable base 116. The handle 112 is attached to the locking member 120 such that the handle 112 may be engaged by a user to toggle the locking member 120 between engagement with the turret member 122 and the wedge holder member 124.

Figure 7A:
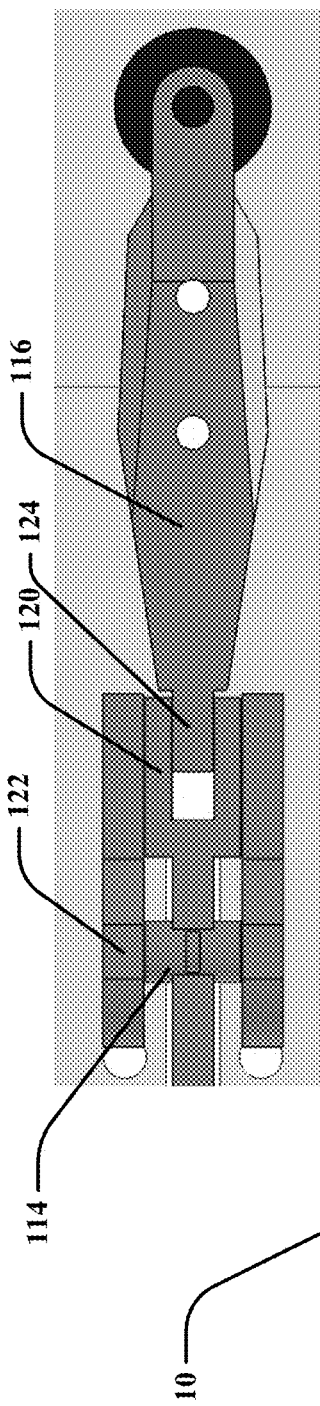
FIGS. 7A-7C illustrate top schematic views of an embodiment of the locking member according to the present disclosure.
Figure 7B:
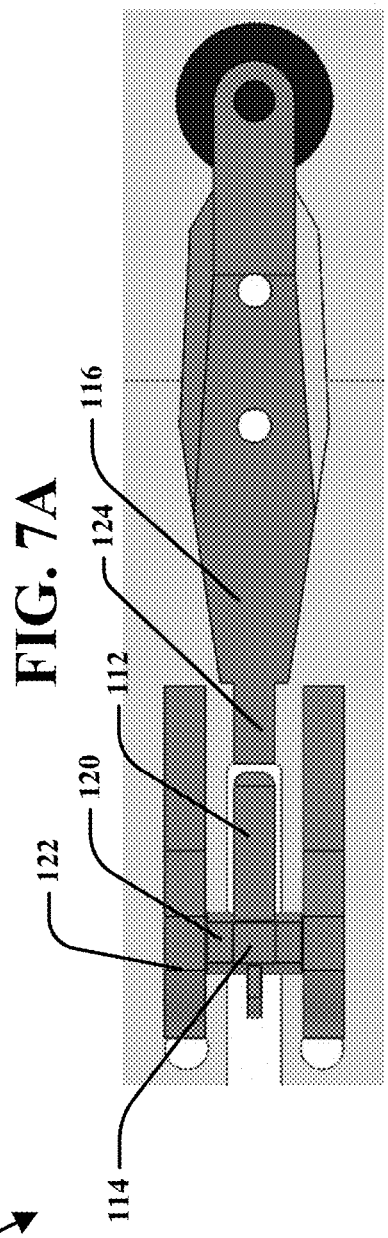
Figure 7C:
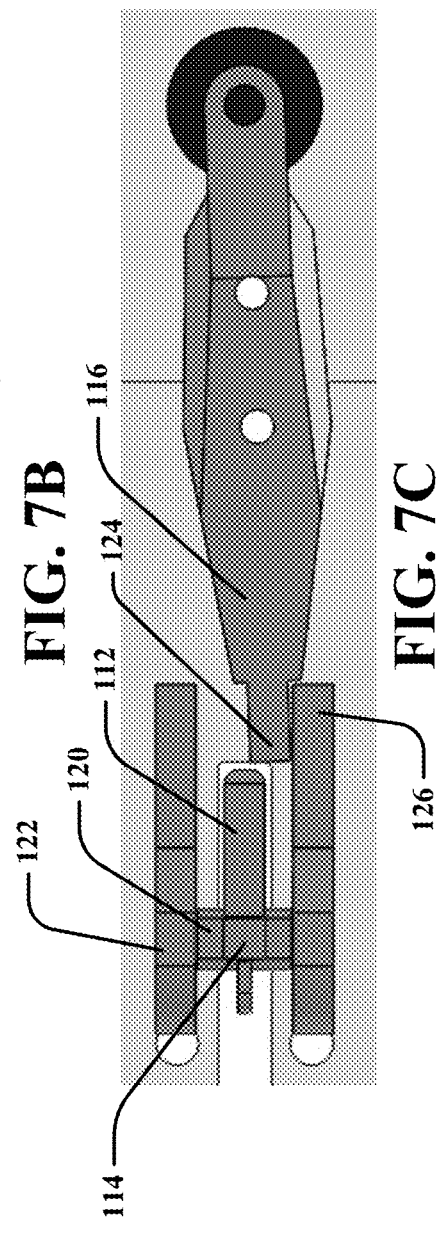

When the locking member 120 engages the wedge holder member 124 (See FIG. 7A), the rotatable base 116 and in turn the wedge 22 do not pivot or translate relative to the elongated arm 40. When the locking member 120 engages the turret member 122 (See FIG. 7B), the towed vehicle attachment assembly 30 does not pivot or rotate relative to the elongated arm 40. Notably, the wedge holder member 124 may also be attached with elongated arm 40 to rotate about the king pin 50. FIG. 7C illustrates how the wedge holder member 124 may pivot relative to the elongated arm 40 about an axis aligned with the rotational axis of the king pin 50. Here the wedge holder member 124 may slightly pivot or rotate between the opposing alignment prongs 126 such that the wedge 22 positioned below the elongated arm 40 also pivots as illustrated by arrows in FIG. 6B to allow for a larger range of pivotal motion between the elongated arm 40 and the walls W of the fifth wheel hitch. In this embodiment, the pivotal direction is generally transverse the elongated length of the elongated arm 40 in a right or left direction. The alignment prongs 126 may extend from opposing sides of the hinge assembly 114 and be aligned with the pivotal range of motion of the locking member 120. In some embodiments, a biasing component, such as a spring of any appropriate configuration, may be attached to the locking member 120. This may lock when the wedge 22 is centered. The biasing member may be operatively attached and positioned in an aperture 115 of the hinge assembly 114.

FIGS. 8A and 8B illustrate another embodiment of the adjustment assembly 20. Here the adjustment member of the adjustment assembly 20 is a side mounted manual rotation member 192 and threaded member 190 positioned along a side 44 of the elongated arm 40. The manual rotation member 192 may have any appropriate configuration. By way of a non-limiting example, the manual rotation member 192 may have a similar configuration to the manual rotation member 92. In such embodiment, the manual rotation member 192 may include a plurality of lobes to assist the user in grasping the manual rotation member 192 to help rotate such—although any embodiment may be used, such as those described above. A nut 196 may be rotationally engaged with the threaded member 192 and pivotally attached to a linkage member 220 of any appropriate configuration. The linkage member 220 may be pivotally attached to the wedge 22 or a base 32 or both. The wedge 22 may be attached to the base 32 or may be aligned within an aperture 38 along the topside 182 of the elongated arm 40. The manual rotation member 192 may be rotated to translate the nut 196 relative to the threaded member 190 and cause the linkage member 220 to pivot relative the nut 196 and the wedge 22 wherein the pivoting motion of the linkage member 220 and wedge 22 relative to the location of the nut 96 along the threaded member 90 slidingly translates the wedge 22. The wedge 22 may be aligned between structural members 222 that guide the motion of the wedge 22 or base 32 (or both) and provide structural stability as the wedge 22 engages the fifth wheel hitch. The wedge 22 may be translatable between an extended positon (FIG. 8A) adjacent to the king pin 50 and a retracted position away from the king pin 50 (FIG. 8B).

FIGS. 9A and 9B illustrate another embodiment of the adjustment assembly 20. Here the adjustment member of the adjustment assembly 20 may include a manual rotation member 392 and threaded member 390 positioned along a side 44 of the elongated arm 40 as identified in FIGS. 8A and 8B. The elongated arm 40 includes an opening 238 in the bottom to allow for the wedge 22 and associated fasteners 24 to be removed from the base 32 and placed within the opening 238 to help make it easier for the user to access the wedge 22. The base 32 may be a wedge carrier and fasteners 24 may be interchangeable between connecting the wedge 22 to the base 32 and to otherwise fasten the elongated arm 40 to the turret 30 as illustrated in FIG. 9B to prevent the towed vehicle attachment assembly 30 from rotating relative to the elongated arm 40. Other fasteners 24 may be utilized to attach the wedge 22 within the opening 238 when disconnected from the carrier 32.

FIGS. 10A-10F illustrates various other embodiments of the adjustment assembly 20. These embodiments the adjustment member is described to include either a drop lock member 300 of any appropriate configuration, a gear adjuster 400, a spring switch 500, a slide lock 600, a throat wedge spring 700 and a throat wedge screw members 800. Each of these embodiments may have the benefits and functionality of the embodiments described above.

The drop lock member 300 may include a handle 302 that locks the wedge 22 in place with a biasing member (such as a spring) that is biased toward the king pin 50 and along the elongated arm 40. The gear adjuster 400 includes a handle 402 and a set of gears 404 engageable with the base 32 or wedge 22 wherein as the gears 404 are allowed to rotate, the base 32 or wedge 22 translates relative to the elongated arm 40. The spring switch 500 may include an elongated handle 502 having a configuration of various turns 504 and straights 506 configured to lock or unlock the wedge 22 or base 32 in a lock or unlocked position relative to the elongated arm 40. Further, a biasing member (such as a spring) may be utilized to bias the wedge 22 or base 32 toward the king pin 50.

The slide lock 600 may include a contoured member 602 having a first surface 604 and a second surface 606 wherein movement of the contoured member 602 relative to the base 32 or wedge 22 may allow for translational movement or adjustment of the wedge 22 relative to the elongated arm 40. The contoured member 602 may extend transversely relative to the elongated arm 40 and extend through a first aperture 614 and a second aperture 616. The contoured member 602 may include a notch 608 and a shoulder 610. The notch 608 may hold the contoured member 602 (or handle) in an open position. A user may pull the contoured member 602 until it locks against the wall 614. The shoulder 610 may abut against a stop member 612 to prevent re-positioning of the contoured member 602 relative to the elongated arm 40.

Figure 10B:
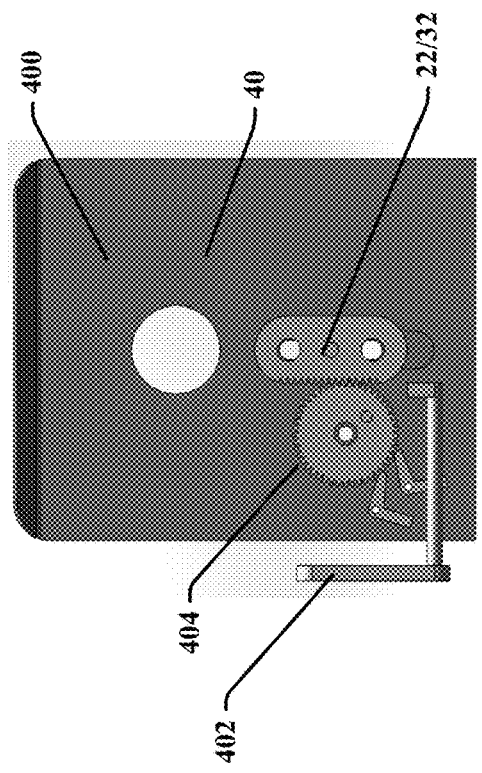
FIG. 10B illustrates another alternative embodiment of the pin box assembly according to the present disclosure.
Figure 10A:
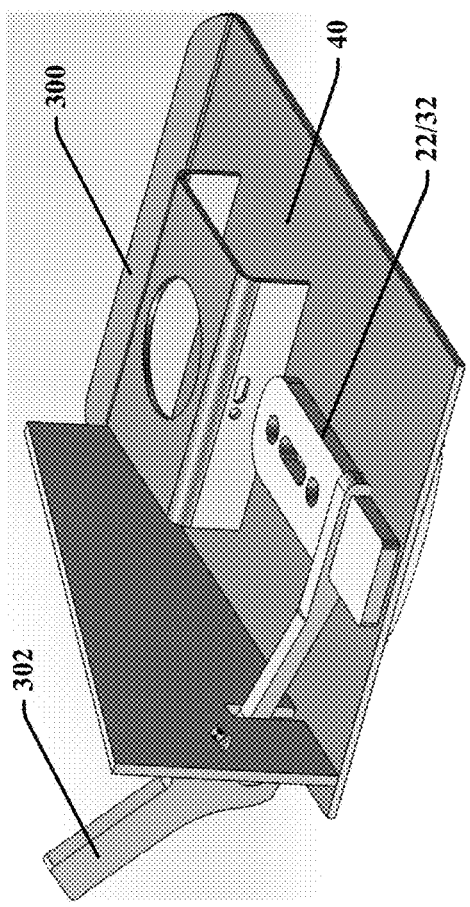
FIG. 10A illustrates another alternative embodiment of the pin box assembly according to the present disclosure.
Figure 10D:
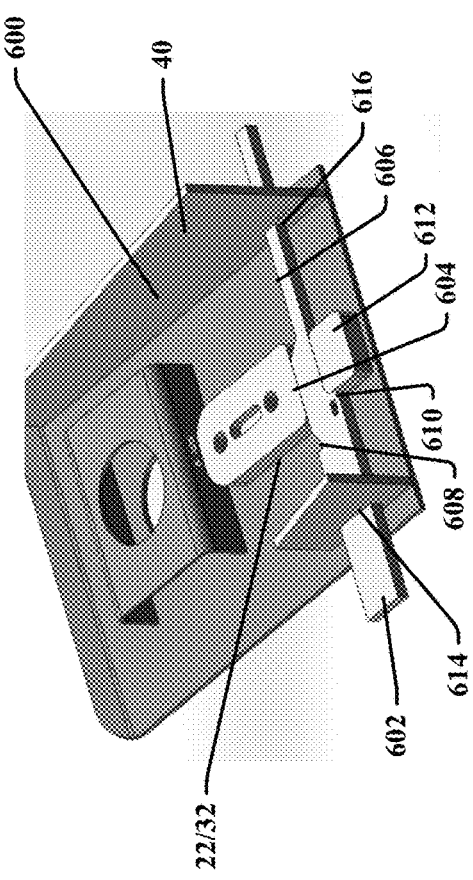
FIG. 10D illustrates another alternative embodiment of the pin box assembly according to the present disclosure.
Figure 10C:
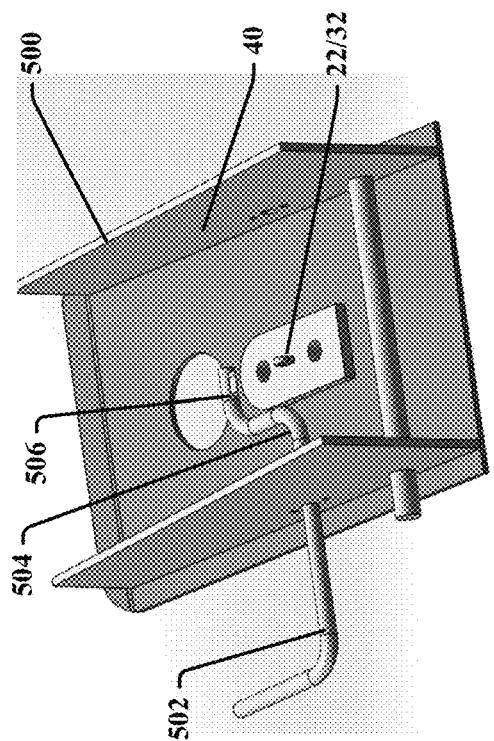
FIG. 10C illustrates another alternative embodiment of the pin box assembly according to the present disclosure.
Figure 10F:
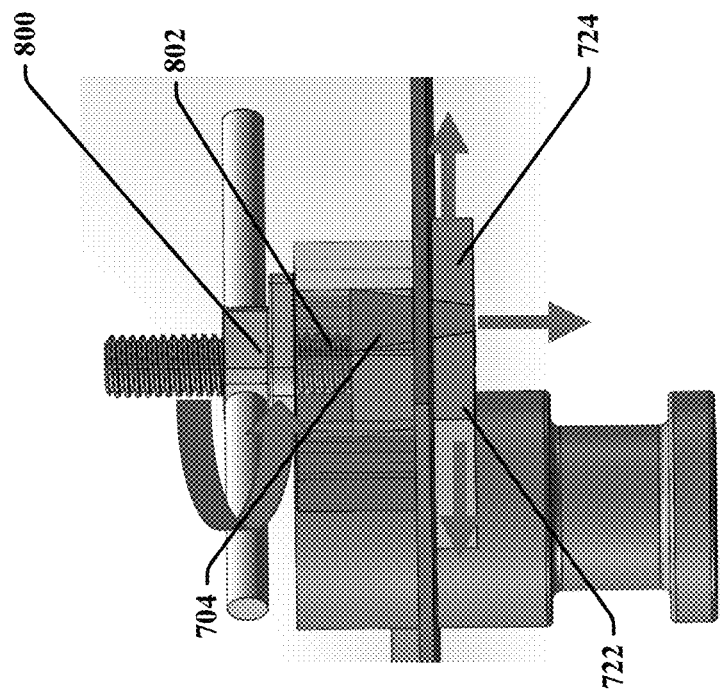
FIG. 10F illustrates another alternative embodiment of the pin box assembly according to the present disclosure.
Figure 10E:
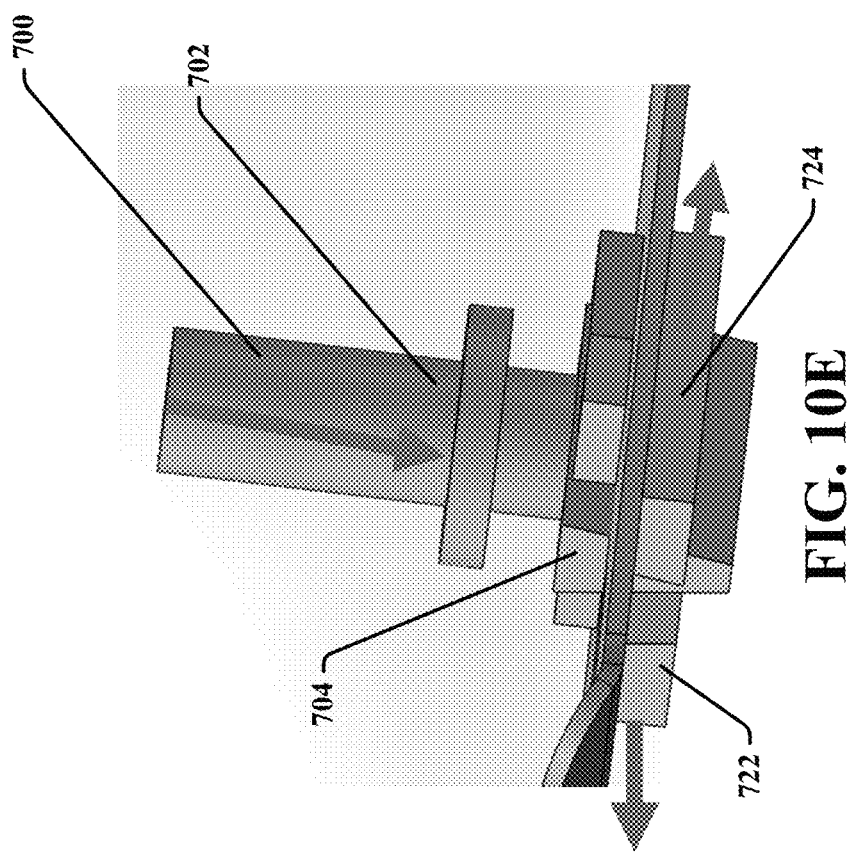
FIG. 10E illustrates another alternative embodiment of the pin box assembly according to the present disclosure.

Additional embodiments of the present teachings are shown in FIGS. 10E and 10F. These embodiments of the adjustment member may comprise a spring 700 version or a screw 800 version. In these embodiments, a throat member 702/802 may include angled sides 704 that slidingly engage against wedge member(s) 722/724. The throat member 702/802 may be adjusted to allow for sliding abutment between the angled sides 704 and the wedge member(s) 722/724. The wedge member(s) 722/724 may be translated outwardly or inwardly relative to the vertical position of the throat member 702/802 along the wedge member(s) 722/724. The wedge member(s) 722/724 may be movable along a plane that is generally transverse relative to the movement of the throat member 702/802. Movement of the throat member 702 may be controlled by a spring 700 or by a screw 800 that is manually adjusted by a user. The throat member(s) 702/802 may be moved vertically downward to push the wedge member(s) 722/724 outward into a fifth wheel hitch throat or funnel opening. This may constrain the pin box assembly about the king pin 50 (e.g., left/right (side-to-side) constraint as opposed to fore/aft movement of the other embodiments shown).

Each of the embodiments (except those show in 10E and 10F) are contemplated to allow the wedge 22 to be translated relative the king pin 50 to adjust the range of pivot motion of the elongated arm relative to the fifth wheel hitch of a towing vehicle.

In use, the function of the pin box assembly 10 may switch between a rotation axis of the pin box assembly 10 along the king pin axis PA and the turret axis TA as illustrated in FIG. 2A. When the wedge 22 is translated towards the king pin 50, the abutment sides 26, 28 may engage against the walls W of the fifth wheel hitch thereby preventing rotation of the elongated arm 40 relative the fifth wheel hitch. Thus, the pin box assembly 10 may allow for an axis of rotation at the turret axis TA so the towed vehicle may pivot or swivel relative to the elongated arm 40. As the wedge 22 is adjusted or translated to a position away from the king pin 50 and generally spaced from the walls W of the fifth wheel hitch it allows for some degree of rotation about the king pin 50 which may not be generally preferred. When the wedge 22 is removed, the towed vehicle attachment assembly or turret 30 may be pivotally locked relative to the elongated arm 40 and the elongated arm 40 may be allowed to rotate between a first pivotal position and a second pivotal positon. If the turret 30 is locked (without lockout bolts) and the wedge 22 is completely removed, the elongated arm 40 can rotate freely about the pin axis of the king pin PA. There is no constraint keeping it in the fifth wheel opening (throat/funnel). The first pivotal position is defined as when the first abutment surface 26 abuts against wall W and the second pivotal position is defined as when the second abutment surface 28 abuts against opposite wall W.

The instant pin box assembly allows for two pivot points along the pin axis PA and the turret axis TA, to allow for one pivot point to be engaged at a time. This allows for only a turret or the kin pin to be locked in combination with any of the embodiments disclosed herein.

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A pin box assembly for coupling a towed vehicle to a towing vehicle comprising:
   a turret member capable of being secured to a towed vehicle;
   an elongated arm attached to the turret member;
   a king pin attached to the elongated arm that is capable of being secured to a fifth wheel hitch of a towing vehicle wherein the elongated arm is configured to rotate along an axis of rotation aligned along the king pin to allow the elongated arm to pivot relative to the fifth wheel hitch; and
   an adjustment assembly including a wedge attached to the elongated arm for adjusting an axis of rotation of the elongated arm relative to the fifth wheel hitch; wherein as the wedge is adjusted or translated to a position away from the king pin and generally spaced from opposing walls of the fifth wheel hitch, the turret member is pivotally locked relative to the elongated arm and the elongated arm is allowed to rotate between a first pivotal position and a second pivotal position.

2. The pin box assembly of claim 1 wherein the wedge is configured to be translated to a position towards the kingpin to decrease a range of motion of the elongated arm relative to the fifth wheel hitch and to be translated to a position away from the kingpin to increase a range of motion of the elongated arm relative to the fifth wheel hitch.

3. The pin box assembly of claim 1 wherein the wedge is configured to be translated along a pivotal direction that is generally transverse to a length of the elongated arm to allow for a range of rotation of the elongated arm relative to a fifth wheel hitch.

4. The pin box assembly of claim 1 wherein the wedge includes a shape having a slender portion positioned towards the king pin that transitions to a wide portion positioned away from the king pin.

5. The pin box assembly of claim 4 wherein the wedge has a shape with a first abutment side along the wide portion of the wedge and a second abutment side along an opposite side of the wide portion of the wedge wherein the first abutment side and second abutment side have a generally complementary shape to opposing walls of the fifth wheel hitch.

6. The pin box assembly of claim 1 further comprising an adjustment member configured to adjust a position of a wedge or a base of the adjustment assembly relative to the king pin.

7. The pin box assembly of claim 6 wherein the adjustment member includes at least one of a snubber member, a manual rotation member, an over center cam mechanism, a rotatable wedge and pivot system, a drop lock member, a gear adjuster, a spring switch, a slide lock, a throat wedge spring member, a throat wedge screw member.

8. The pin box assembly of claim 7 wherein the adjustment member includes a rotatable wedge and pivot system that further comprises a locking member configured to toggle the turret member between a locked position and an unlocked position.

9. The pin box assembly of claim 8 wherein in the locked position, the turret member does not pivot relative to the elongated arm and in the unlocked position, the turret member is allowed to pivot relative to the elongated arm.

10. The pin assembly of claim 1 wherein the turret member is configured to rotate about an axis of rotation at a turret axis aligned along the turret member to allow the towed vehicle to pivot or swivel relative to the elongated arm.

11. A pin box assembly for coupling a towed vehicle to a towing vehicle comprising:
    a turret member capable of being secured to a towed vehicle;
    an elongated arm attached to the turret member;
    a king pin for attachment to a fifth wheel hitch of a towing vehicle; and
    an adjustment assembly including an adjustment member and a wedge wherein the adjustment member is configured to adjust a position of the wedge relative to the king pin for adjusting the axis of rotation of the elongated arm relative to the fifth wheel hitch; and
    wherein the wedge is positioned along an underside of the elongated arm and is attached to a base positioned within the elongated arm such that the wedge and base are configured to be translated along a pivotal direction that is generally transverse to a length of the elongated arm to allow for a range of rotation of the elongated arm relative to a fifth wheel hitch.

12. The pin box assembly of claim 11, wherein the wedge is further configured to be translated to a position towards the kingpin to decrease a range of motion of the elongated arm relative to the fifth wheel hitch and to be translated to a position away from the kingpin to increase a range of motion of the elongated arm relative to the fifth wheel hitch.

13. The pin box assembly of claim 11 wherein the wedge includes a shape having a slender portion positioned towards the king pin that transitions to a wide portion positioned away from the king pin wherein the wedge having a shape with a first abutment side along the wide portion of the wedge and a second abutment side along an opposite side of the wide portion of the wedge wherein the first abutment side and second abutment side have a generally complementary shape to opposing walls of the fifth wheel hitch.

14. The pin box assembly of claim 11 wherein the adjustment member includes at least one of a snubber member, a manual rotation member, an over center cam mechanism, a rotatable wedge and pivot system, a drop lock member, a gear adjuster, a spring switch, a slide lock, a throat wedge spring member, and a throat wedge screw member.

15. The pin box assembly of claim 14 wherein the adjustment member includes the rotatable wedge and pivot system that further comprises a locking member configured to toggle the turret member between a locked position and an unlocked position.

16. The pin box assembly of claim 15 wherein in the locked position, the turret member does not pivot relative to the elongated arm and in the unlocked position, the turret member is allowed to pivot relative to the elongated arm.

17. The pin box assembly of claim 11 wherein the elongated arm includes an aperture along an underside wherein said aperture allows a user to access the adjustable member or store the wedge within the elongated arm.

18. The pin box assembly of claim 11 wherein the adjustment member is a side mounted manual rotation member mounted along a side of the elongated arm.

* * * * *